(12) United States Patent
Clymer

(10) Patent No.: US 11,808,869 B1
(45) Date of Patent: Nov. 7, 2023

(54) HIGH SPEED CORRELATION DIRECTION FINDING

(71) Applicant: BAE Systems Information and Electronic Systems Integration Inc., Nashua, NH (US)

(72) Inventor: Richard E. Clymer, Concord, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 525 days.

(21) Appl. No.: 16/887,617

(22) Filed: May 29, 2020

(51) Int. Cl.
 *G01S 3/48* (2006.01)
 *G01S 3/02* (2006.01)
 *H01Q 3/26* (2006.01)

(52) U.S. Cl.
 CPC ............... *G01S 3/48* (2013.01); *G01S 3/023* (2013.01); *H01Q 3/267* (2013.01)

(58) Field of Classification Search
 None
 See application file for complete search history.

(56) References Cited

U.S. PATENT DOCUMENTS

| 2017/0082722 A1* | 3/2017 | Kabel | G01S 5/0294 |
|---|---|---|---|
| 2020/0072936 A1* | 3/2020 | Clymer | G01S 3/28 |
| 2020/0256982 A1* | 8/2020 | Slaven | G01S 3/043 |

* cited by examiner

*Primary Examiner* — Whitney Moore
(74) *Attorney, Agent, or Firm* — Sand, Sebolt & Wernow LPA; Gary McFaline

(57) ABSTRACT

Correlation interferometry direction finding (CIDF) processes that significantly improve processing time and cut memory requirements relative to the current memory requirements are provided herein. The presently disclosed processes further may utilize only the real portion of the correlation coefficient of the RF signal to further increase processing speed and decrease memory requirements while simultaneously improving direction finding accuracy and reducing the number of wild bearings reported.

9 Claims, 8 Drawing Sheets

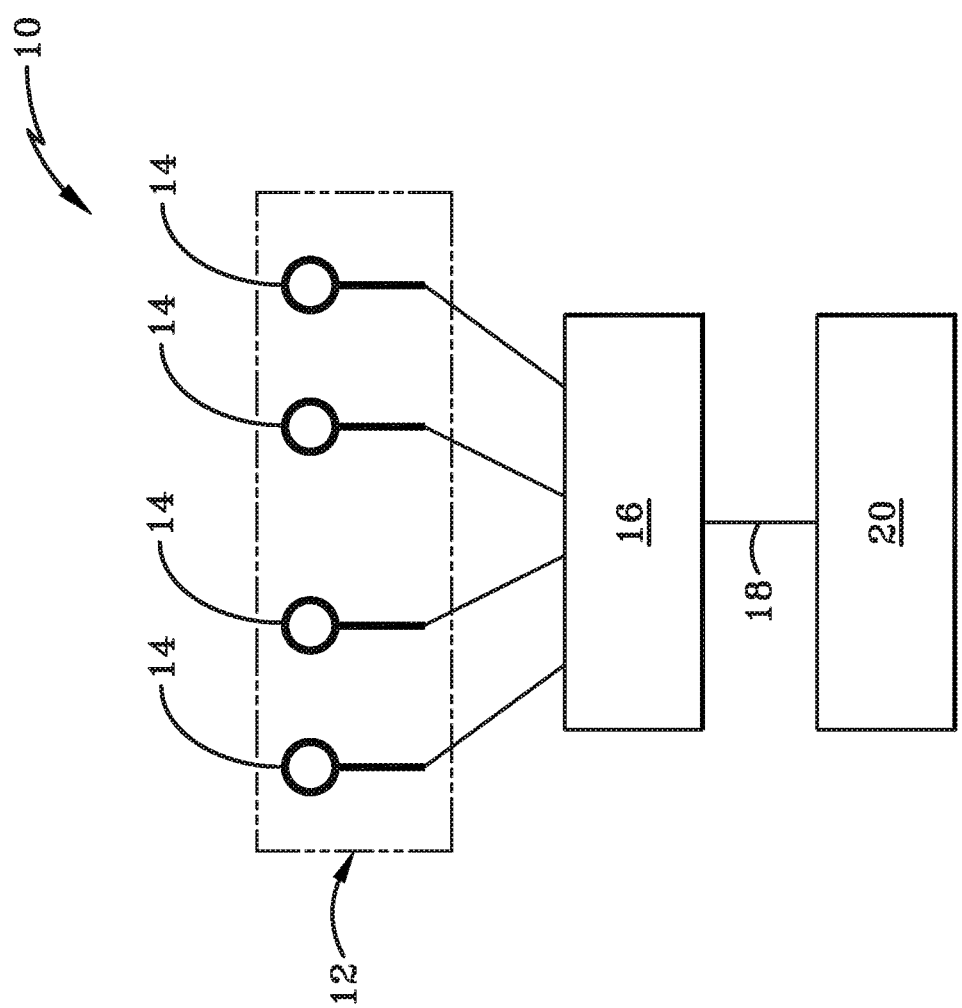

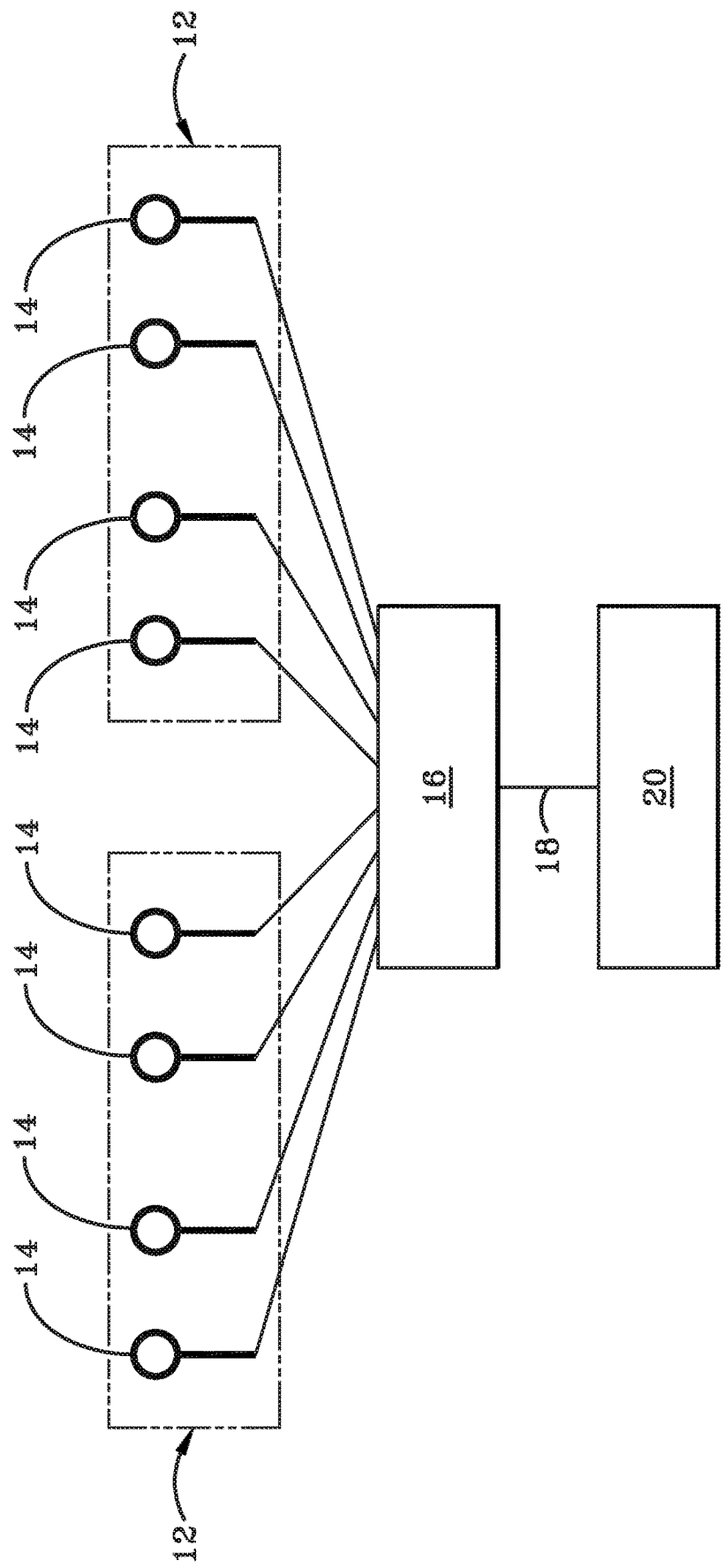

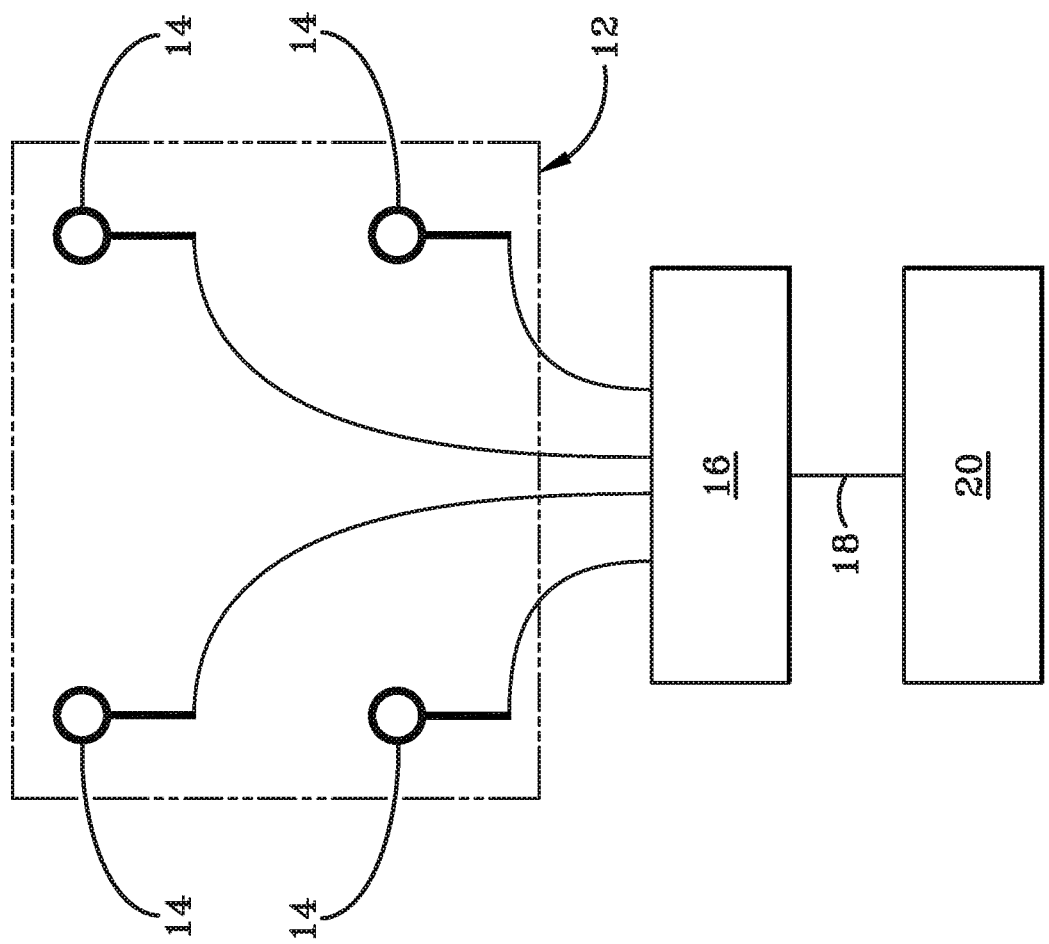

HIGH SPEED CORRELATION DIRECTION FINDING

STATEMENT OF GOVERNMENT INTEREST

This invention was made with government support under a classified contract number awarded by a classified agency. The government has certain rights in this invention.

TECHNICAL FIELD

The present disclosure relates to a method of direction finding with improved processing speed and accuracy. More particularly, in one example, the present disclosure relates to processes of direction finding using only the phase or only the real portions of the correlations between measured and calibrated radio frequency (RF) signals. Specifically, in another example, the present disclosure relates to processes for direction finding solutions utilizing the phase only or the real portions of the correlation between measured and calibration RF signals to enhance the accuracy of the direction finding system while simultaneously increasing the processing speed of direction finding solutions.

BACKGROUND

The process of locating the source of an emitted signal, which is known as direction finding (DF), is common to many applications. For example, direction finding can be used in navigation, search and rescue, tracking wildlife, and locating illegal transmitters. In military applications, direction finding helps in target acquisition and tracking of enemy locations and movements. Nearly all modern militaries use some form of direction finding to guide their ships, aircraft, troops, and/or munitions in one or more ways. For example, direction finding is the process by which enemy emitters are detected and/or geolocated, thus providing information to military operators as to location and type of emitter being used which can further be used to identify enemy units and/or troops and the movements thereof.

Direction finding is typically done using an antenna or antenna array to detect a signal with an unknown direction of origin. Once a signal is detected, the signal characteristics are often compared to a database populated with expected signal characteristics from simulated detections. These databases can be extremely large, having tens of thousands of data points representing the expected polarization signals at all azimuth angles and all elevations, for multiple types of polarization (e.g. vertical, horizontal, circular, etc.), and for multiple frequencies.

Current processes typically use correlation interferometry direction finding (CIDF) to compare the detected signal to the database via one or more correlation equations to determine the best match. This process is viewed as a "brute force" process which requires a large number of calculations using complex numbers and a large number of stored complex antenna array calibration values. As the number of radio frequency (RF) signals increase, direction finding solutions are required for an increasing number of signals, thus often placing performance limits on the DF system based on processing speed and memory requirements.

Further, as military technology advances, new emitters have come online that are capable of operation in multiple frequencies of the electromagnetic spectrum and across multiple channels. These advanced emitters are capable of both broadcasting and receiving in short, non-continuous bursts and are considered to be very agile systems that may jump through frequency and dynamic ranges to evade detection while maintaining effective detection capabilities on their own. Most of these modern emitters have a low probability of intercept (LPI) and emit single short radar pulses at varying intervals in their attempts to avoid detection. The sheer number and volume of calculations required by current CIDF based systems can cause the processing time to exceed the detection time, thus making it more difficult to detect and/or properly determine the direction of origin for such signals.

SUMMARY

The present disclosure addresses these and other issues by providing more robust correlation interferometry direction finding (CIDF) processes that significantly improve processing time and cut memory requirements relative to the current memory requirements. The presently disclosed processes further may utilize only the real portion of the correlation coefficient of the RF signal to further increase processing speed and decrease memory requirements while simultaneously improving direction finding accuracy and reducing the number of wild bearings reported.

In one aspect, an exemplary embodiment of the present disclosure may provide a system comprising: a platform; at least one antenna array including a plurality of antennas therein; a receiver; at least one processor capable of executing logical functions in communication with the receiver and the at least one antenna array; and at least one non-transitory computer readable storage medium having instructions encoded thereon that, when executed by the processor, implements operations to determine the direction of origin for an incoming signal, the instructions including: detect an incoming signal; collect signal data from the incoming signal; analyze the collected data using one of a Phase Only Real Correlation Interferometry Direction Finding (POR-CIDF) process and a Real Correlation Interferometry Direction Finding (R-CIDF) process; and generate a direction finding result representing the direction of origin for the incoming signal. This exemplary embodiment or another exemplary embodiment may further provide wherein the instructions further include: calibrate the system relative to a reference antenna from the plurality of antennas in the array; and create and store a database of expected signal characteristics relative to the same reference antenna from the plurality of antennas in the array, prior to detecting the incoming signal. This exemplary embodiment or another exemplary embodiment may further provide wherein the calibration of the system, the creation and storage of the database of expected signal characteristics, and the detection of the incoming signal are performed relative to the same reference antenna from the plurality of antennas in the array. This exemplary embodiment or another exemplary embodiment may further provide wherein the instructions further include: communicate the direction finding results to one or both of the platform and an operator thereof. This exemplary embodiment or another exemplary embodiment may further provide wherein the POR-CIDF process is performed using cosine terms to calculate a correct bearing of the incoming signal. This exemplary embodiment or another exemplary embodiment may further provide wherein the R-CIDF process is performed using the real portion of a correlation coefficient to calculate a correct bearing of the incoming signal. This exemplary embodiment or another exemplary embodiment may further provide wherein the plurality of antennas in the at least one antenna array have matching antenna patterns and the data is analyzed using the POR- CIDF process. This exemplary embodiment or another exemplary embodiment may further provide wherein the plurality of antennas in the at least one antenna array have non-matching amplitude patterns and the data is analyzed using the R-CIDF process. This exemplary embodiment or another exemplary embodiment may further provide wherein the platform is one of an aircraft, a munition, a sea-based, a land-based vehicle, and a man-portable direction finding system.

In another aspect, an exemplary embodiment of the present disclosure may provide a method of direction finding comprising: detecting an incoming signal via an antenna array including a plurality of antennas carried by a platform; collecting signal data from the incoming signal; applying a Phase Only Real Correlation Interferometry Direction Finding (POR-CIDF) process to the signal data; and generating a direction finding result representing the direction of origin for the incoming signal. This exemplary embodiment or another exemplary embodiment may further provide wherein the antenna array is one of a linear array and a dual orthogonal linear array and the plurality of antennas therein are arranged in the same vertical plane without amplitude pattern variation therebetween. This exemplary embodiment or another exemplary embodiment may further provide wherein the POR-CIDF process is performed using one or both of a cosine and sine term to determine a correct bearing of the incoming signal. This exemplary embodiment or another exemplary embodiment may further provide wherein the POR-CIDF process is performed using a correlation coefficient calculation to determine the correct bearing of the incoming signal. This exemplary embodiment or another exemplary embodiment may further provide calibrating the system relative to a reference antenna from the plurality of antennas in the array; and creating and storing a database of expected signal characteristics relative to the same reference antenna from the plurality of antennas in the array, prior to detecting the incoming signal. This exemplary embodiment or another exemplary embodiment may further provide communicating the direction finding result to one or both of the moving platform and an operator thereof; and taking an action in response to the direction finding result.

In yet another aspect, an exemplary embodiment of the present disclosure may provide a method of direction finding comprising: detecting an incoming signal via an antenna array including a plurality of antennas carried by a platform; collecting signal data from the incoming signal; applying a Real Correlation Interferometry Direction Finding (R-CIDF) process to the signal data; and generating a direction finding result representing the direction of origin for the incoming signal. This exemplary embodiment or another exemplary embodiment may further provide wherein the plurality of antennas in the array are arranged with amplitude pattern variation therebetween. This exemplary embodiment or another exemplary embodiment may further provide wherein the R-CIDF process is performed using one or both of a cosine and sine term to determine the correct bearing of the incoming signal. This exemplary embodiment or another exemplary embodiment may further provide wherein the R-CIDF process is performed using a correlation coefficient calculation to determine a correct bearing of the incoming signal. This exemplary embodiment or another exemplary embodiment may further provide calibrating the system relative to a reference antenna from the plurality of antennas in the array; and creating and storing a database of expected signal characteristics relative to the same reference antenna from the plurality of antennas in the array, prior to detecting the incoming signal. This exemplary embodiment or another exemplary embodiment may further provide communicating the direction finding result to one or both of the moving platform and an operator thereof; and taking an action in response to the direction finding result.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 1A is a schematic view of an exemplary single linear array system according to one aspect of the present disclosure.

FIG. 2A is a schematic view of an exemplary dual orthogonal linear array system according to one aspect of the present disclosure.

FIG. 3A is a schematic view of an exemplary quadrant wing/tail array system according to one aspect of the present disclosure

Similar numbers refer to similar parts throughout the drawings.

DETAILED DESCRIPTION

Figure 1B:
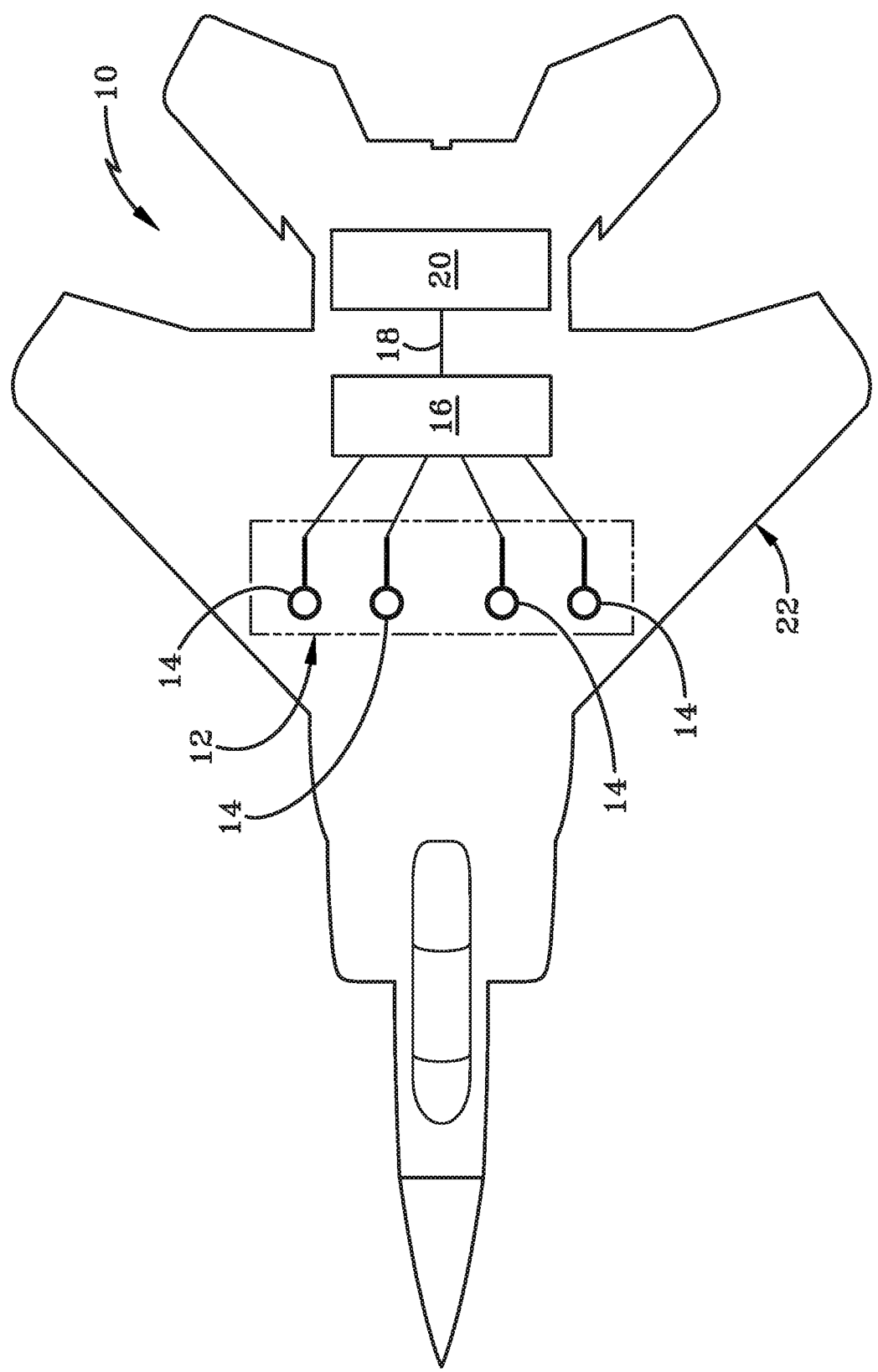
FIG. 1B is an overhead schematic view of an exemplary single linear array system installed on a platform according to one aspect of the present disclosure.
Figure 2B:
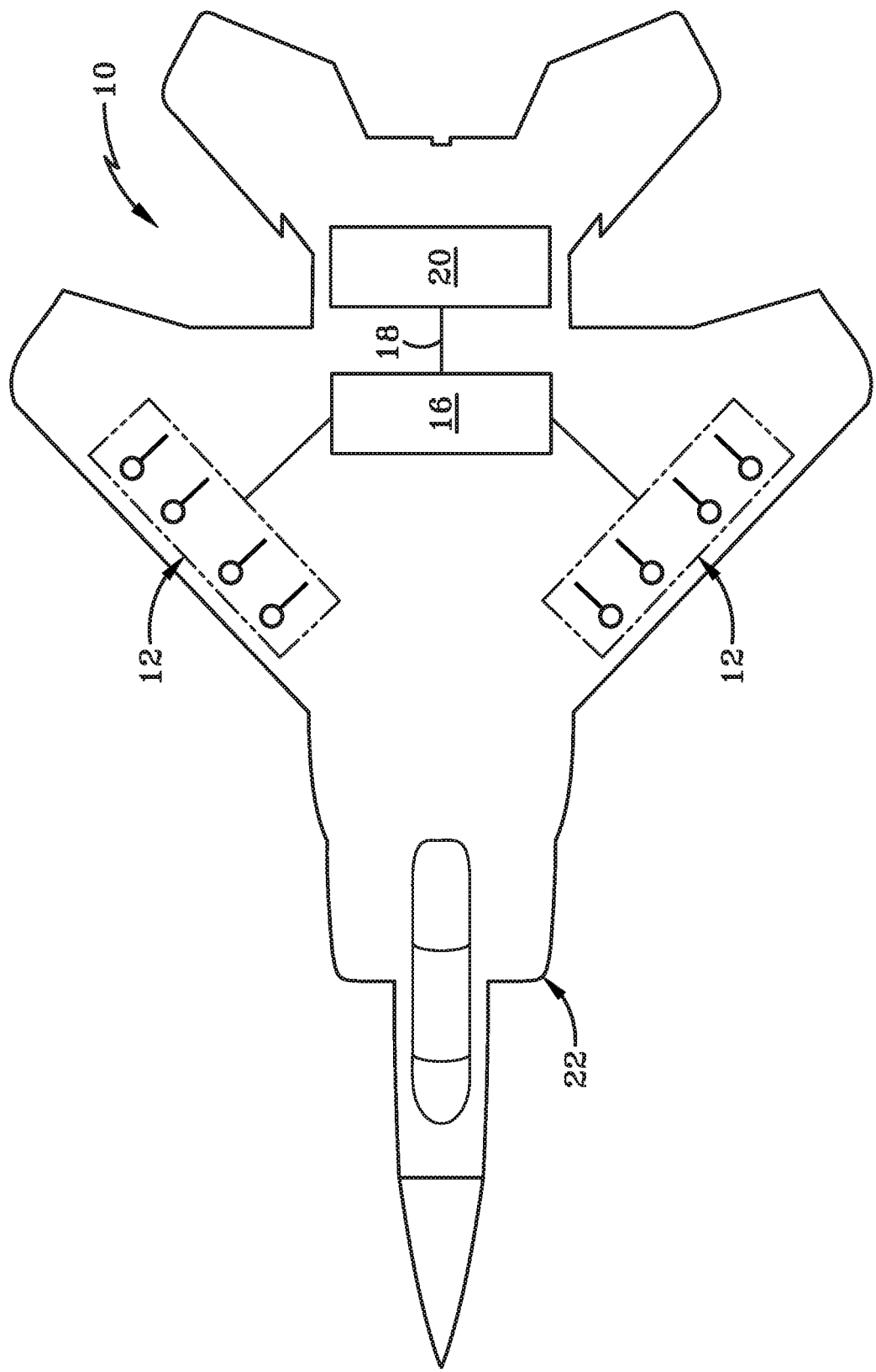
FIG. 2B is an overhead schematic view of an exemplary dual orthogonal linear array system installed on a platform according to one aspect of the present disclosure.
Figure 3B:
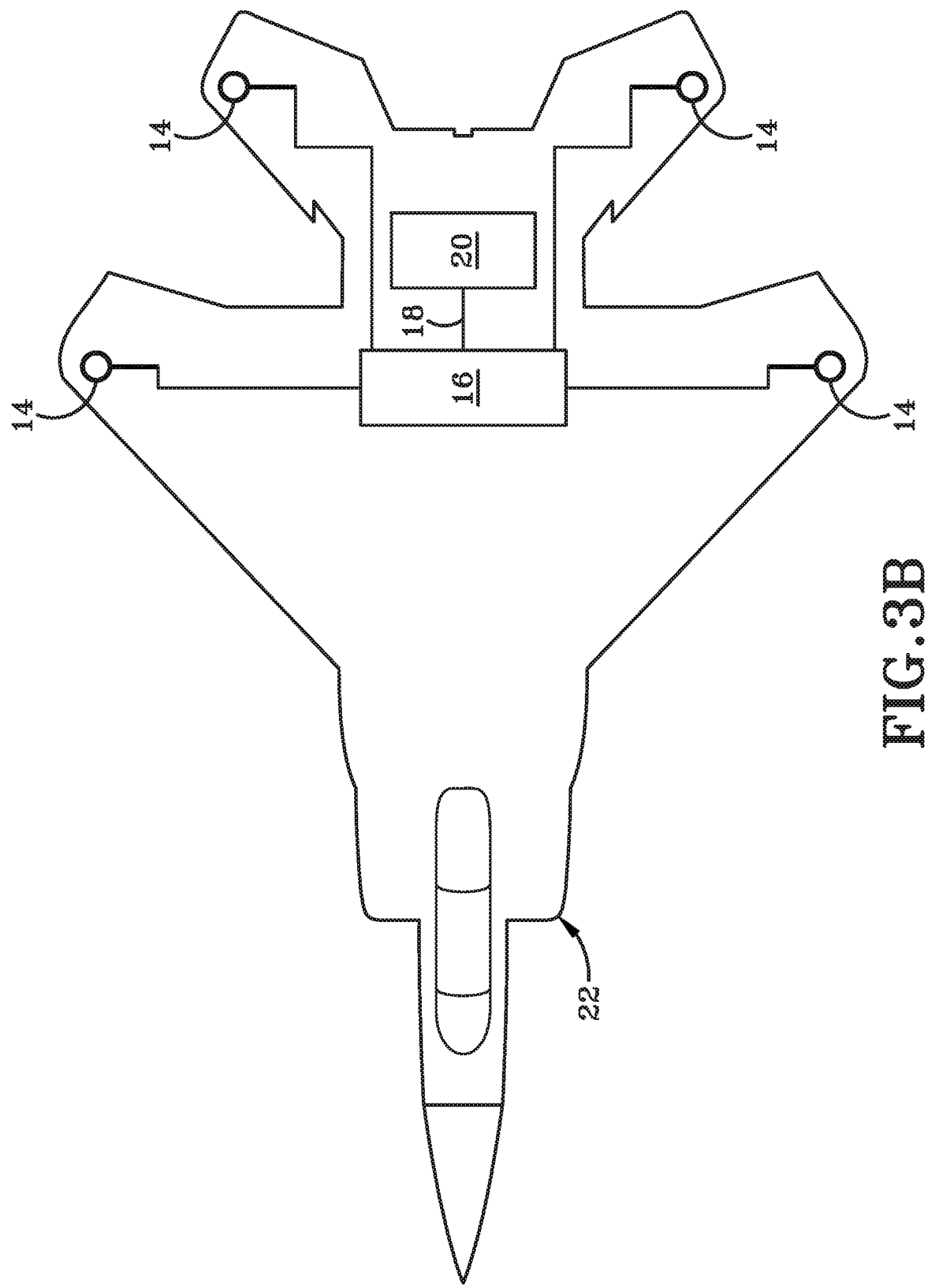
FIG. 3B is an overhead schematic view of an exemplary quadrant wing/tail array system installed on a platform according to one aspect of the present disclosure.

With reference to FIGS. 1A-3B, a direction finding (DF) system is shown and generally indicated at reference 10. DF system 10 may include one or more antenna arrays 12 including one or more antennas 14, at least one receiver 16, at least one output 18, and at least one processor 20. As depicted in FIGS. 1B, 2B, and 3B, DF system 10 may be installed on a platform 22, which is depicted and discussed herein as an aircraft; however, DF system 10 may be installed on a variety of platforms 22 as discussed further herein.

Antenna arrays 12 may include one or more antennas 14 in any configuration and may be installed in any position on platform 22. For example, as depicted in FIGS. 1A and 1B, a single antenna array 12 may be installed on the body of platform 22 and may be arranged with four antennas 14 in a single linear array configuration. Alternatively, as depicted in FIGS. 2A and 2B, two or more antenna arrays 12 may be installed on platform 22, such as on each wing of an aircraft as depicted therein, and each antenna array 12 may have four or more antennas 14 arranged in a dual orthogonal linear array configuration.

With reference to FIGS. 3A and 3B, antenna array 12 may include four or more antennas 14 that are installed on platform 22 in a quadrant pattern such as depicted in FIG. 3B with one antenna 14 installed on each wing and each side of the tail of an aircraft as shown therein. These various configurations will be discussed further herein with reference to the operation of DF system 10.

Antennas 14 may be monopole, dipole, or directional antennas or any combination thereof and may be arranged in any desired configuration appropriate for their installation conditions. Although discussed predominantly herein in either linear arrangements or quadrant arrangements, antennas 14 may have any desired configuration, including as arranged in existing legacy configurations, on platform 22 as dictated by the specific installation parameters and the type of platform 22 used. For example, one particular antenna 14 arrangement may work better for a particular platform 22 with another antenna 14 arrangement being better suited for a different platform 22. By way of one further non-limiting example, an attack aircraft may be better suited for a particular antenna 14 arrangement while a reconnaissance aircraft may find advantages with different or multiple antenna array 12 arrangements.

Receiver 16 may be a computer or processor or alternatively a computing system that can store and/or execute the process or processes disclosed herein. According to one example, the receiver 16 may be a digital receiver that processes digital signals. According to another example, the receiver 16 may be an analog receiver that processes signals in the analog domain wherein such signals are converted to the digital domain for further processing as discussed herein. Alternatively, receiver 16 may be an intermediary between antenna array 12 and processor 20. According to this aspect, receiver 16 can have a direct connection to processor 20 via the at least one output 18.

Output 18 may be a direct wired connection between receiver 16 and processor 20 that can allow unidirectional or bidirectional communications therebetween. According to another aspect, output 18 may be a wireless datalink between receiver 16 and processor 20 utilizing any suitable wireless transmission protocol.

Processor 20 may be a computer, a logic controller, a series of logics or logic controllers, a microprocessor, or the like that can store and/or execute the process or processes disclosed herein. According to one aspect, processor 20 may further include or be in communication with at least one non-transitory storage medium. According to one aspect, the at least one receiver 16, at least one output 18, and at least one processor 20 may be contained within a single unit and, in connection with the at least one storage medium, can store and/or execute the process or processes disclosed herein. According to another aspect, receiver 16 may be remote from processor 20 and in communication therewith. Although depicted in the figures in a linear arrangement, it will be understood that antenna arrays 12, antennas 14, receivers 16 and/or processors 20 may be placed in any configuration as dictated by the desired implementation and may not be arranged linearly or in any particular order.

Antenna array 12, antennas 14, receiver 16 and/or processor 20 may further be in communication with other components or systems on board the platform 22 such that relevant data may be communicated therebetween. For example, where platform 22 is an aircraft, onboard flight systems may relay data to the receiver 16 and/or processor 20 such as heading, altitude, flight speed, geolocation, and the like. Similarly, receiver 16 and/or processor 20 may communicate data regarding detected signals, DF results and the like to the platform 22, including to an operator or operators thereof. As discussed further below, data regarding detected signals, DF results, and the like that may be communicated to the platform 22 and/or to an operator thereof, may allow responsive actions to be taken by platform 22. For example, an unmanned aircraft, such as a drone or a guided munition, may take automated actions such as steering towards the signal (as in a targeting situation), steering away from the signal (as in evasive maneuvers), jamming the signal, deploying defensive countermeasures, or any other appropriate responsive action. A manned aircraft make take similar responsive action through automatic response systems (such as deploying countermeasures) or may allow the operator/pilot of the aircraft to choose whether or not to employ any appropriate responsive actions.

As mentioned above, platform 22 is discussed and depicted herein as an aircraft, however, it will be understood that platform 22 may be a vehicle of any type that is capable of carrying DF system 10 and performing the necessary steps to determine the direction of a detected signal, as discussed further herein. Thus it will be further understood that platform 22 may be an aircraft, either manned or unmanned, including fixed wing and/or rotary aircraft, a munition, rocket, or other propelled vehicle, a sea-based or land-based vehicle, or may be any suitable stationary installation. According to another aspect, platform 22 may be a man-portable direction finding system.

DF system 10 may include legacy assets, such as legacy antenna arrays 12, antennas 14, receivers 16, outputs 18, and/or processors 20. Any or all of these assets may be legacy assets which may be retrofitted with software or other instructions to accomplish the features of the present disclosure without significantly increasing size, weight, power, or cost to existing legacy DF systems. The process or processes discussed herein may further be uploaded to existing legacy assets or may be added thereto through the use of an additional memory module, including an additional non-transitory storage medium or through the use of temporary memory devices, such as flash memory or the like. Accordingly, the DF system 10 of the present disclosure may allow existing legacy assets to be used without adjustments thereto.

Having thus described the general configuration and components of DF system 10, the operation and method of use thereof will now be discussed.

Figure 4:
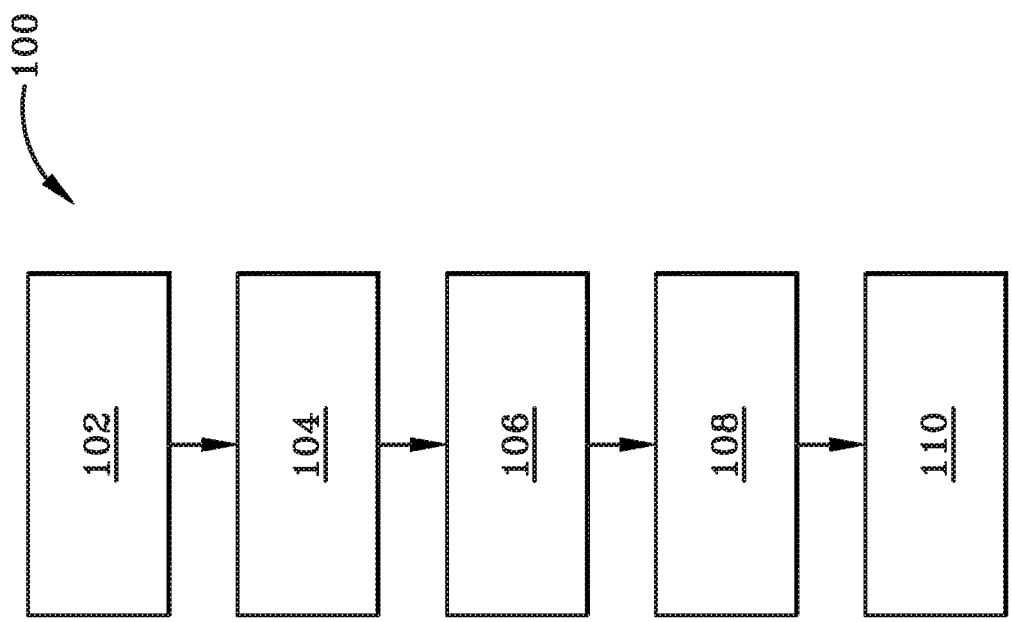
FIG. 4 is a flow chart representing a method of use according to one aspect of the present disclosure.

With reference to FIG. 4, a process for high speed correlation direction finding is shown and generally indicated as process 100. This process 100 assumes that the array 12 has been properly installed and calibrated according to the desired implementation, and that a database of expected signal characteristics has previously been generated and stored. The calibration of array 12 and creation and storage of the relevant database is indicated as step 102 in process 100, and is expected to be performed prior to "real world" operation of DF system 10. When calibrating the array 12, process 100 requires that the calibration be relative to the same reference antenna as the reference antenna used for the detected/measured signal. For example, if operation of DF system 10 will be done relative to a specific antenna 14 within array 12, process 100 assumes that the calibration and database are likewise performed relative to that same antenna. While there are known processes that allow for post calibration creation of the reference antenna, this reference antenna should be the same as the expected usage reference antenna prior to creating and storing the database. If the calibration is not to the same operational reference antenna, and the database has been created relative to the different reference antenna, a standard correlation interferometry direction finding (CIDF) process may be used, but the advantages of the present process 100 will not be realized. By way of a simplified, but non-limiting example, if a linear array 12 with four antennas 14 is being used, it may number the antennas 14 from one to four, left to right (for example, in FIG. 1A). For process 100 to be used, if the first antenna 14 is the operational reference point, the calibration should be performed and the database created and stored relative to the first antenna 14. In this example, if the calibration were to be performed and the database created relative to the second antenna 14, a standard CIDF process may be employed, but without the benefits and advantages provided by process 100.

Once the array 12 has been calibrated and the database has been created and stored, the next step in process 100 may be the detection of an emitted pulse or signal, most commonly in the form of a radio frequency (RF) signal, from an emitter having an unknown direction of origin. This detection of an emitted signal is indicated as reference 104 in process 100.

The signal may be detected as it moves across or otherwise encounters the antennas 14 of the one or more antenna arrays 12 and data relating to the signal may be captured thereby and provided to receiver 16 via the at least one output 18. The capturing and communication of the signal data is indicated in process 100 as step 106.

At its most basic operational level, receiver 16 may translate the signal data into a form usable by processor 20 to determine the direction of origin of the signal. According to one aspect, the receiver may generate what is known as a pulse descriptor word (PDW) according to known processes. This PDW may then be delivered through output 18 to processor 20 for further processing. The processing step is indicated as reference 108 in process 100 and may be the main aspect as to how process 100 differs from current CIDF processes, as discussed below.

Finally, once the signal data is processed, a DF result may be generated and the direction of origin of the detected signal relative to platform 22 may be determined. The generation and communication of the DF result is indicated as reference 110. It will be understood that process 100 may be a general method of use for DF system 10, however, process 100 may differ from current DF processes in several aspects. Accordingly, each individual step in process 100 will now be further discussed in detail.

Emitters in an area of operation are known to generate a pulse of electromagnetic energy, such as radar, in an effort to monitor, locate, and/or identify any aircraft or units operating nearby. Most commonly, this is in the form of a RF pulse/signal. In order to maintain agility and minimize the risk of being intercepted, these emitters typically emit a short length pulse that can utilize the motion of the operating unit to gather information about that unit. For example, a radar pulse may be generated for a period of time that is sufficiently long enough to gather information about the unit operating nearby. Common information determined from these pulses may include whether the unit is friend or foe, what type of unit it is, e.g. if the unit is an aircraft, what type of aircraft it is, the speed, heading, and/or direction of origin. Further, the emitter may use the pulse data to determine the number of units as well as their formation, spacing, and similar data. The use of short, non-continuous burst may allow an emitter to gather this information without revealing too much information about the emitter itself.

These short duration pulses may be detected by DF system 10, but as they are limited in duration, the speed at which DF system 10 operates, i.e. the speed at which the system 10 can determine the direction of origin for these pulses, becomes increasingly important. Further, as these pulses may represent a threat to the platform 22 carrying DF system 10, the accuracy of the DF result is equally, if not more important as an incorrect result could result in negative outcomes. For example, when platform 22 is an unmanned aircraft, providing an incorrect DF result may cause that aircraft to steer towards a threat, which may ultimately result in the loss of the platform 22, according to this example. Incorrect DF results may be referred to hereinafter as "wild bearings" and may be understood to be an identified direction of origin for a detected signal that is not the actual direction of origin for that particular signal. By way of a simplified example, a signal originating from directly in front of a DF system 10 array 12 (and at the same elevation) would have a DF result of zero degrees (0°), indicating that the signal is 0° from the front of the array 12. If the platform 22 is an aircraft, this would be directly in front of the nose of the aircraft. If DF system 10 were to determine that this same signal originated from 45° to the right instead of from the actual direction of origin (0°), that would be a "wild bearing."

As discussed above, platform 22 may be operating in an area of operations with known emitter activity. As it relates to process 100 discussed further herein, the example of platform 22 being an aircraft either manned or unmanned will be maintained for simplicity of disclosure, however, it will be understood that platform 22 may be any installation capable of carrying and operating the components of DF system 10. While discussed herein as a mobile platform 22, it will be further understood that process 100 and the steps thereof may be performed by stationary and/or fixed installations as well. Further, it will be understood that the operation of platform 22 may be accomplished using the same or similar actions and systems regardless of the configurations of DF system 10 carried thereon. More specifically, three examples have been provided and shown in the figures, particularly FIGS. 1A-3B of aircraft having three different configurations of antenna arrays 12. Process 100 and the operation of platform 22 may have the same or similar steps regardless of which of these three examples, or of other array 12 configurations (including non-aircraft installations) are used.

Thus, regardless of the array 12 configuration and platform, the first step in process 100 is to calibrate the array 12 being used and to create the database of expected signal characteristics. Typically, this database contains a series of signal measurements (such as signal frequency, polarization, amplitude, and the like) taken by the array 12, or a simulated version thereof, prior to being employed into an active detection environment. Specifically, an array 12 is installed (or simulated) in the environment in which it is intended to operate. Then, a series of signals may be emitted towards the array 12 from multiple angles which may then be detected by the array 12. The signal measurements then taken by array 12 may be stored in a database which can be kept on the storage medium in communication with processor 20. The signals directed at array 12 during the creation of this database can include multiple signals originating from various angles and having different polarizations, phases, amplitudes, and/or frequencies. By way of one non-limiting example, the database can be created to contain expected signal characteristics from signals having vertical and horizontal polarizations emitted at known intervals, such as every two degrees azimuth around the array 12. According to another aspect, signals can be emitted and the characteristics recorded at predetermined intervals in both azimuth and elevation.

According to one aspect, the database can be created using simulations of array 12 in the installation environment. These simulations can include 3-D modelling, scale models, partial installations, computer generated simulations, or other known modelling techniques. According to another aspect, array 12 may be installed in the actual installation environment and used to create the database of expected signal characteristics. For example, an array 12 may be installed on an aircraft which can be flown in an operational environment while signals are emitted and detected to create the database.

As discussed above, the calibration of array 12 and the creation of the database should be performed in reference to the same reference antenna as will be used in operation of DF system 10. If the calibration is not performed relative to the expected operational reference point (such as to a specific antenna 14 in the array 12), the calibration data may be manipulated using known processes to artificially create the reference point prior to creating and storing the database. Once the calibration of array 12 and the creation of the database of expected signal characteristics are complete, they may be reused as many times as needed or desired, until and unless specific components, such as antennas 14 and/or arrays 12, or the configuration thereof changes. Put another way, the database need only be created once per configuration and reference point within array 12 and may be reused as desired for the same array 12 or similar arrays having the same characteristics/components and reference points.

Having created and stored the database of expected signal characteristics, the platform 22 carrying DF system 10 may be put into operation to detect signals with an unknown direction of origin and to provide a DF result therefor. Thus, in operation, array 12 may then detect a signal with an unknown direction of origin and data from that signal may be collected, as dictated by the desired implementation. According to one aspect, phase data, or phase difference data, may be detected and collected by array 12. According to another aspect, amplitude data, or amplitude difference data may be detected and collected by array 12. According to yet another aspect, both phase difference and amplitude difference data may be detected and collected by array 12.

Generally, where a single linear array 12, such as is shown in FIGS. 1A and 1B, is utilized, DF system 10 may collect phase-only data of the signal, as phase-only data may provide an accurate and high speed DF result, as discussed below. Dual linear arrays 12, such as is shown in FIGS. 2A and 2B, may likewise allow for phase-only data collection and DF results, provided both arrays 12 are operated in the same vertical plane (i.e. have little to no amplitude pattern variation). In instances where the antennas 14 of an array 12 are not linear (e.g. as in the quadrant array 12 shown in FIGS. 3A and 3B), or where the antennas 14 of the array 12 are not in the same vertical plane (for example, two on the wings of an aircraft and two higher up on the tail of the aircraft), amplitude data may be collected along with, or instead of, phase-only data, as dictated by the desired implementation, as discussed further below.

Generally, having then collected the signal data from the detected signal, those data may be communicated through output 18 to processor 20, wherein those data may be processed according to the type of data collected. For example, when collecting phase-only data, the processing thereof may be done according to a first method, while signal data containing amplitude information may be processed according to a separate method. Each of these will now be discussed further.

Phase Only Real Correlation Interferometry Direction Finding

When using phase-only data collected from the detected signal, the first processing method may be a derivative of CIDF hereinafter referred to as Phase Only Real Correlation Interferometry Direction Finding (POR-CIDF). As discussed above, POR-CIDF may be utilized where the antennas 14 in the array 12 are linear with little to no amplitude pattern variation. In these instances, amplitude values in standard CIDF calculations provide little benefit, and can, in fact, degrade the DF performance by introducing amplitude measurement errors that effectively apply unintended weight to the DF antenna 14 measurements. Further, it has been found that standard CIDF calculations provide that the complex correlation coefficient is nearly entirely real at the correct bearing (i.e. at the correct direction of origin for the unknown/detected signal). Thus, utilizing POR-CIDF may simplify the DF process and may provide an increase in processing speed and accuracy while simultaneously reducing calibration memory requirements.

The POR-CIDF algorithm maximizes the correlation between measured and calibration RF signal phases in the direction of the arriving (detected) signal with regard to spatial angle. Signal phases are measured in the receiver 16 and compared with calibration phases associated with potential spatial angles, typically azimuth and elevation, and at the closest frequency to the measured signal. The POR-CIDF calibration database consists of representative phases (or pre-calculated sin and cos terms) for angles covering the required spatial field of view (FOV) and the required frequency range. An array 12 used with POR-CIDF typically consists of two or more antennas 14 and the antennas 14 are spaced in order to minimize the likelihood of ambiguous DF bearings.

Once the correlation coefficients are calculated at each of the calibration spatial points, a peak search for the largest coefficient value is typically performed. A spatial interpolation about the peak coefficient spatial point can be performed for improved DF accuracy.

The equation for computing the cosine terms is derived from the CIDF equation shown in Equation 3-1.

Equation 3-1 – CIDF Correlation Calculation $$R(\varnothing^t, \theta^t) = \frac{\sum_{n=ant1}^{N} U_n(\varnothing^i, \theta^i) V_n^*(\varnothing^t, \theta^t)}{\sqrt{\sum_{n=ant1}^{N} |U_n(\varnothing^i, \theta^i)|^2 \sum_{n=ant1}^{N} |V_n(\varnothing^i, \theta^i)|^2}}$$

Where:
  $R(\phi^t, \theta^t)$=Correlation Coefficient
  $U_n$=Measured element voltage for the nth element
  $V_n$=Calibration voltage for the nth element
  \* Denotes Complex Conjugate
  N=Total number of elements
  $(\phi^t, \theta^t)$=Calibration (testing) Azimuth and Elevation angles or indices, respectively, may also be referred to as indices (i,j)
  $(\phi^i, \theta^i)$=Azimuth and Elevation angles or fractional indices, respectively, of the target signal.

If only the phases of the measured signals are used, the magnitude of the voltages in Equation 3-1 are, by definition, one, making the denominator term equal to the number of antennas. The CIDF equation for phase only measurements can be rewritten as shown in Equation 3-2:

Equation 3-2 – POR–CIDF $$R(\varnothing^t, \theta^t) = \frac{\sum_{n=ant1}^{N} e^{j\varphi_{meas,n}} e^{j\varphi_{cal,n}}}{N}$$

Where, $\varphi_{meas,n}$=Measured phase for the nth element (in degrees with a range from −179.9° to 180.0°)

$\varphi_{cal,n}$=Calibration phase for the nth element (in degrees with a range from −179.9° to 180.0°)

If the measured and calibration voltages are relative to the same reference antenna 14, which is typically the case, the real part of the correlation coefficient can be used. It is again understood that if the calibration reference and the operational reference (e.g. the reference antenna) is different between the measured and calibration measurements, even if just a constant phase bias is added to one of the voltage sets, the imaginary part of the correlation coefficient is required to obtain an accurate DF calculation and the benefits of the POR-CIDF method will not be realized. Accordingly, if the calibration and measured phases are normalized to the same reference, the correlation coefficient is real at the correct bearing. Only using the real part of the correlation coefficient maximizes the value at the correct bearing and lowers the value at incorrect bearings. A performance enhancement is seen when using the real part of the correlation coefficient in the POR-CIDF method. Equation 3-2 can be rewritten as shown in Equation 3-3.

Equation 3–3 – Phase Only CIDF Rewritten $$R(\emptyset^t, \theta^t) = \frac{\sum_{n=ant1}^{N} e^{j(\varphi_{meas,n} - \varphi_{cal,n})}}{N} =$$

$$\frac{\sum_{n=ant1}^{N} (\cos(\varphi_{meas,n} - \varphi_{cal,n}) + j\sin(\varphi_{meas,n} - \varphi_{cal,n}))}{N}$$

Equation 3–4 –

Real Part of the Phase Only CIDF Equation (POR–CIDF)

$$\text{Re}\{R(\emptyset^t, \theta^t)\} = \frac{\sum_{n=ant1}^{N} \cos(\varphi_{meas,n} - \varphi_{cal,n})}{N}$$

By storing 16 bit calibration phases with (360°/2^16) 0.006 degree resolution, DF system 10 will require only one half the current CIDF voltage calibration memory. If memory or processing time can be benefitted by using 8 bit phase values, a resolution of (3600/2^8) 1.40 degrees can be obtained. This corresponds to a worse case phase error of (resolution/2) 0.7 degrees, which is typically a small fraction of the overall DF phase error allocation. If the phase measurements are made relative to a reference channel, say antenna 1 (e.g. any one specific antenna 14 of array 12 (such as the first antenna 14 to the left in FIG. 1A), then the first term in the sum in Equation 3-4 will always be one, so only the relative phases of antennas 2 through N need to be stored and used for the cosine calculations. Dividing by N only normalizes the equation to 1.0. Since we are simply searching for the peak, having the peak normalized to say, 4.0, for a 4.0 element array does not hinder performance. Correlation threshold parameters would have to be updated to the relevant ideal peak, if the denominator term is removed for enhanced processing speed. Equation 3-4 can be updated if phase measurements are made relative to a reference channel and normalization is not necessary, as shown in Equation 3-5.

Equation 3–5 – POR–CIDF for Reference

Relative Measurments and Without Normalization $$\text{Re}\{R(\emptyset^t, \theta^t)\} = \sum_{n=ant2}^{N} \cos(\varphi_{meas,n} - \varphi_{cal,n})$$

The cosine term associated with the reference antenna 14, assumed here to be antenna 1, is 1.0 since there is no phase difference between the measurement and the calibration phase and doesn't need to be included. If there are two arrays 12 (such as is shown in FIGS. 2A and 2B), the calculation is simply the summation of the non-reference cosine terms. For two, four antenna 14 arrays 12, it would be the summation of 3 cosines from the first array 12 and three cosines from the second array 12. The peak possible correlation in this case would be 6.0. It should be noted that when amplitude weights are used, all four antenna 14 voltages are used in the standard CIDF calculations with a four element array 12, while POR-CIDF only uses three phase differences, resulting in the associated processing time savings.

Using the trigonometric identity of cos(a-b)=cos(a)cos(b)+sin(a)sin(b), Equation 3-5 can be rewritten as the following:

Equation 3–6 – POR–CIDF Equation where $\cos(\Phi_{cal,n})$ and $\sin(\Phi_{cal,n})$ can be Pre – Calculated and Stored $$\text{Re}\{R(\emptyset^t, \theta^t)\} = \sum_{n=ant2}^{N} \cos(\varphi_{meas,n}) \cdot \cos(\varphi_{cal,n}) + \sin(\varphi_{meas,n}) \cdot \sin(\varphi_{cal,n})$$

Calculating and storing the cosine and sine of the calibration phases means that only the cosine and sine of the measurement phases need to be calculated for each DF answer. For two, four element arrays 12, this means that only 6 cosines and 6 sines need to be calculated for each DF answer. If Equation 3-5 is used, (6)×(the number of calibration spatial points) cosines need to be calculated for each DF answer. 3,000 calibration spatial points is not uncommon, so for this example, Equation 3-5 requires that 18,000 cosines be calculated for each DF answer.

Processing time may be further improved by performing multiplication over matrices. When system delta phase measurements are made, the cosine and sine of the measurement can be calculated. These cosine and sine terms can be multiplied with the stored calibration matrices of $\cos(\varphi_{cal,n})$ and $\sin(\varphi_{cal,n})$ terms.

Figure 5:
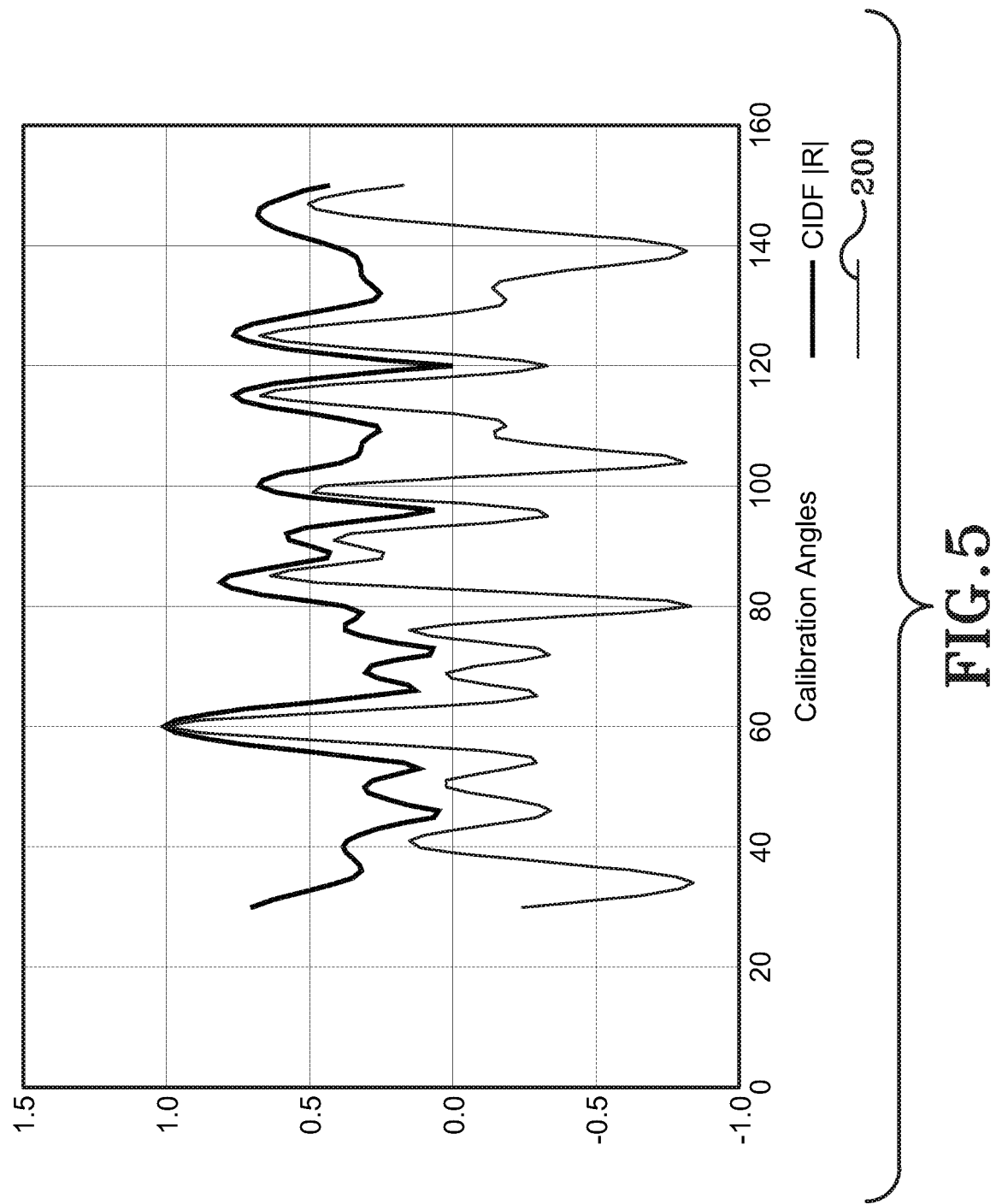
FIG. 5 is a graphical comparison of current correlation interferometry direction finding processes compared to the processes according to one aspect of the present disclosure.

With reference to FIG. 5, a correlation comparison of the magnitude of the CIDF correlation coefficient (represented by the bolded, upper line) and a POR-CIDF coefficient (represented by the lower line and indicated at reference 200 in the key). The POR-CIDF correlation values assume a three element POR-CIDF coefficient (i.e. a four antenna 14 array 12) and are therefore normalized to 1.0 (by dividing by 3) for comparative purposes.

As seen then in FIG. 5, the narrower correlation peak at 60° coupled with the lower correlation side lobes, indicate that an improved DF result is achieved having a higher accuracy and lower rate of wild bearings.

In addition to improved accuracy and fewer wild bearings, increases in processing speed of up to 6×due to the elimination of complex numbers and a reduction in mathematical operations may be realized utilizing the POR-CIDF method. Further increases in processing speed may be realized when pre-calculating and storing the cosine and sine of the calibration phases (up to an additional 29% improvement in processing speed), and when utilizing matrix multiplication instead of processing loops (up to an additional 7×improvement in processing speed). The improvements indicated in this paragraph are understood to be relative to the current CIDF process and specific software implementations.

Real Correlation Interferometry Direction Finding

When the data collected from the detected signal includes amplitude data, or alternatively, when the amplitude data collected from the signal cannot be disregarded, such as when using array 12 configurations where the antennas 14 provide amplitude pattern variation (e.g. a quadrant array 12 like that shown in FIGS. 3A and 3B), POR-CIDF may not be appropriate. In these instances, a second processing method, also a derivative of CIDF, may be utilized. This second processing method may hereinafter be referred to as Real Correlation Interferometry Direction Finding (R-CIDF). While standard CIDF algorithms may be employed in these scenarios, the correlation coefficient at the correct bearing is still nearly entirely real (as it was with POR-CIDF). Thus, by calculating just the real component of that correlation coefficient, the calculations may be simplified which may result in improved DF accuracy (including reduced wild bearings), improved processing speed, and a reduction in the required calibration memory.

The R-CIDF algorithm maximizes the real part of the correlation between measured and calibration RF signal voltages in the direction of the arriving signal with regard to spatial angle. Signal voltages are measured in the receiver 16 and compared with calibration phases associated with potential spatial angles, typically azimuth and elevation, and at the closest frequency to the measured signal. The R-CIDF calibration database consists of representative amplitudes and phases (or pre-calculated sin and cos terms) for angles covering the required spatial field of view (FOV) and the required frequency range. An antenna array 12 used with R-CIDF typically consists of two or more antennas 14 and the antennas 14 are spaced in order to minimize the likelihood of ambiguous DF bearings.

Once the real component of the correlation coefficients are calculated at each of the calibration spatial points, a peak search for the largest value is typically performed. A spatial interpolation about the peak coefficient spatial point can be performed for improved DF accuracy.

The equation for computing the correlation coefficient is derived from the CIDF equation, as previously shown in Equation 3-1 and reproduced here as Equation 4-1.

Equation 4-1 – CIDF Correlation Calculation $$R(\varnothing^t, \theta^t) = \frac{\sum_{n=ant1}^{N} U_n(\varnothing^i, \theta^i) V_n^*(\varnothing^t, \theta^t)}{\sqrt{\sum_{n=ant1}^{N} |U_n(\varnothing^i, \theta^i)|^2 \sum_{n=ant1}^{N} |V_n(\varnothing^t, \theta^t)|^2}}$$

Where:
$R(\phi^t, \theta^t)$=Correlation Coefficient
$U_n$=Measured element voltage for the nth element
$V_n$=Calibration voltage for the nth element
\* Denotes Complex Conjugate
N=Total number of elements
$(\phi^t, \theta^t)$=Calibration (testing) Azimuth and Elevation angles or indices, respectively, may also be referred to as indices (i,j)
$(\phi^i, \theta^i)$=Azimuth and Elevation angles or fractional indices, respectively, of the target signal.

Changing the voltage terms in Equation 4-1 to amplitude and phase, provides Equation 4-2.

Equation 4-2 – CIDF with $Ae^{j\varphi}$ Terms $$R(\varnothing^t, \theta^t) = \frac{\sum_{n=ant1}^{N} A_n^i A_n^t \left(e^{j\varphi_n^i} e^{-j\varphi_n^t}\right)}{\sqrt{\sum_{n=ant1}^{N} A_n^{i2} \sum_{n=ant1}^{N} A_n^{t2}}}$$

Where:
$A_n^i$=Measured voltage amplitude for the nth element (in relative voltage magnitude with a range from −25.0 to +25.0)
$A_n^t$=Calibration voltage amplitude for the nth element at calibration spatial point $(\phi^t, \theta^t)$ (in relative voltage magnitude with a range from −25.0 to +25.0)
$\phi_n^i$=Measured phase for the nth element (in degrees with a range from −179.9° to 180.0°)
$\phi_n^t$=Calibration phase for the nth element at calibration spatial point $(\phi^t, \theta^t)$ (in degrees with a range from −179.9° to 180.0°)

If the measured and calibration voltages are relative to the same reference antenna 14, which is typically the case, the real part of the correlation coefficient can be used. It is again understood that if the calibration reference and the operational reference (e.g. the reference antenna) is different between the measured and calibration measurements, even if just a constant phase bias is added to one of the voltage sets, the imaginary part of the correlation coefficient is required to obtain an accurate DF calculation and the benefits of the R-CIDF method will not be realized. Accordingly, if the calibration and measured phases are normalized to the same reference, the correlation coefficient is real at the correct bearing. Only using the real part of the correlation coefficient maximizes the value at the correct bearing and lowers the value at incorrect bearings. A performance enhancement is seen when using the real part of the correlation coefficient in the R-CIDF method. Equation 4-2 can be rewritten as shown in Equation 4-3.

Equation 4-3 – CIDF Rewritten $$R(\varnothing^t, \theta^t) == \frac{\sum_{n=ant1}^{N} A_n^i A_n^t (\cos(\varphi_n^i - \varphi_n^t) + j\sin(\varphi_n^i - \varphi_n^t))}{\sqrt{\sum_{n=ant1}^{N} A_n^{i2} \sum_{n=ant1}^{N} A_n^{t2}}}$$

Equation 4-4 – Real Part of the CIDF Equation (R–CIDF)

$$\text{Re}\{R(\varnothing^t, \theta^t)\} = \frac{\sum_{n=ant1}^{N} A_n^i A_n^t \cos(\varphi_n^i - \varphi_n^t)}{\sqrt{\sum_{n=ant1}^{N} A_n^{i2} \sum_{n=ant1}^{N} A_n^{t2}}}$$

Using the trigonometric identity of cos(a-b)=cos(a)cos(b)+sin(a)sin(b), Equation 4-4 can be rewritten as the following:

$$\text{Re}\{R(\varnothing^t, \theta^t)\} = \sum_{n=ant2}^{N} \left(\frac{A_n^i \cos(\varphi_n^i)}{\sqrt{\sum_{n=ant1}^{N} A_n^{i2}}}\right) \cdot \left(\frac{A_n^t \cos(\varphi_n^t)}{\sqrt{\sum_{n=ant1}^{N} A_n^{t2}}}\right) +$$

$$\sum_{n=ant2}^{N} \left(\frac{A_n^i \sin(\varphi_n^i)}{\sqrt{\sum_{n=ant1}^{N} A_n^{i2}}}\right) \cdot \left(\frac{A_n^t \sin(\varphi_n^t)}{\sqrt{\sum_{n=ant1}^{N} A_n^{t2}}}\right)$$

Or $$Re\{R(\varnothing^t, \theta^t)\} = \sum_{n=ant2}^{N} \left( \frac{A_n^i \cos(\varphi_n^i)}{\sqrt{\sum_{n=ant1}^{N} A_n^{i2}}} \right) \cdot Cal_{cos}(\varnothing^t, \theta^t) + \sum_{n=ant2}^{N} \left( \frac{A_n^i \sin(\varphi_n^i)}{\sqrt{\sum_{n=ant1}^{N} A_n^{i2}}} \right)$$

Equation 4–5 – R–CIDF Equation where

Calibration Terms can be Pre–Calculated and Stored

Where, $Cal_{cos}(\varnothing^t, \theta^t)$ = Pre–Calculated Cosine Calibration Term $$\left( \frac{A_n^t \cos(\varphi_n^t)}{\sqrt{\sum_{n=ant1}^{N} A_n^{t2}}} \right) \text{ for calibration spatial point } (\varnothing^t, \theta^t)$$

$Cal_{sin}(\varnothing^t, \theta^t)$ = Pre–Calculated Sine Calibration Term $$\left( \frac{A_n^t \sin(\varphi_n^t)}{\sqrt{\sum_{n=ant1}^{N} A_n^{t2}}} \right) \text{ for calibration spatial point } (\varnothing^t, \theta^t)$$

Calculating and storing weighted cosine and sine calibration terms means that only the weighted cosine and sine measurement terms need to be calculated for each DF answer, each of these being multiplied by the pre-calculated calibration terms. For two, four element arrays 12, this means that only 6 weighted cosines and 6 weighted sines need to be calculated for each DF answer. The reference antenna 14 will have an amplitude of 1.0 and a phase of 0 for both the measurement and calibration signals.

Processing time may be further improved by performing multiplication over matrices. When system delta phase measurements are made, the cosine and sine of the measurement can be calculated. These cosine and sine terms can be multiplied with the stored calibration matrices of $\cos(\varphi_{cal,n})$ and $\sin(\varphi_{cal,n})$ terms.

With reference to FIG. 5, the correlation comparison of the magnitude of the CIDF correlation coefficient (represented by the bolded, upper line) and a POR-CIDF coefficient (represented by the lower line and indicated at reference 200 in the key) is equally applicable and realized using the R-CIDF method as the graph represents the use of the real components at the correct bearing. Accordingly, the R-CIDF process, again assumes a three element R-CIDF coefficient (i.e. a four antenna 14 array 12); however, unity weights are used with the R-CIDF process.

Again, as seen in FIG. 5 and with the POR-CIDF process, the narrower correlation peak at 60° coupled with the lower correlation side lobes, indicate that an improved DF result is achieved having a higher accuracy and lower rate of wild bearings.

In addition to improved accuracy and fewer wild bearings, R-CIDF may provide increases in processing speed of up to 2×due to the elimination of imaginary calculations. Further increases in processing speed may be realized when pre-calculating and storing the cosine and sine of the calibration phases (up to an additional 3×improvement in processing speed), and when utilizing matrix multiplication instead of processing loops (up to an additional 7×improvement in processing speed). As with POR-CIDF, the improvements indicated in this paragraph are understood to be relative to the current CIDF process and specific software implementations.

Once the collected signal data is processed according to one of the above methods (e.g. POR-CIDF or R-CIDF), the resulting output may be the DF result, indicating the direction of origin for the detected signal. Accordingly, as indicated above, this DF result may be communicated to an operator, operators, and/or to platform 22 and responsive action may be taken, as desired or dictated by the mission parameters. Some non-limiting examples of responsive actions have been discussed herein, and may include directing the platform towards or away from the emitter, jamming the emitter, deploying countermeasures, directing munitions, or the like. These responsive actions may be automated or directed by the operator of the platform 22 as appropriate for the specific implementation and objective. Additionally, no response may be chosen, either automatically or by the operator, when appropriate.

While discussed herein for use in direction finding applications, including those utilizing CIDF, it will be understood that the processes described herein may benefit other correlation processes. According to one aspect, the disclosed processes may be employed for geo-location, Correlation Interferometry Geo-Location, and Xtreme Single Ship Geo-Location processes, for example. According to another aspect, any correlation process that uses complex correlation coefficient calculations may benefit from phase-only and real part calculations disclosed herein.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A system comprising:
   a platform;
   at least one antenna array including a plurality of antennas therein;
   a receiver;
   at least one processor capable of executing logical functions in communication with the receiver and the at least one antenna array; and
   at least one non-transitory computer readable storage medium having instructions encoded thereon that, when executed by the processor, implements operations to determine the direction of origin for an incoming signal, the instructions including:
   detect an incoming signal;
   collect signal data from the incoming signal;
   analyze the collected data using one of a Phase Only Real Correlation Interferometry Direction Finding (POR-CIDF) process and a Real Correlation Interferometry Direction Finding (R-CIDF) process;
   wherein the POR-CIDF process comprises calculating a real part of a correlation coefficient according to $$R(\varnothing^t, \theta^t) = \frac{\sum_{n=ant1}^{N} e^{j\varphi_{meas,n}} e^{-j\varphi_{cal,n}}}{N}$$

or its mathematical equivalent, where
   $\varphi_{meas,n}$=Measured phase for the nth element (in degrees with a range from −179.9° to 180.0°)
   $\varphi_{cal,n}$=Calibration phase for the nth element (in degrees with a range from −179.9° to 180.0°)

and wherein the R-CIDF process comprises calculating a real part of a correlation coefficient according to $$\text{Re}\{R(\varnothing^t, \theta^t)\} = \sum_{n=ant2}^{N} \left(\frac{A_n^i \cos(\varphi_n^i)}{\sqrt{\sum_{n=ant1}^{N} A_n^{i2}}}\right) \cdot Cal_{cos}(\varnothing^t, \theta^t) + \sum_{n=ant2}^{N} \left(\frac{A_n^i \sin(\varphi_n^i)}{\sqrt{\sum_{n=ant1}^{N} A_n^{i2}}}\right) \cdot Cal_{sin}(\varnothing^t, \theta^t)$$

or its mathematical equivalent, where $Cal_{cos}(\varnothing^t, \theta^t)$ = Pre−Calculated Cosine Calibration Term $\left(\frac{A_n^t \cos(\varphi_n^t)}{\sqrt{\sum_{n=ant1}^{N} A_n^{t2}}}\right)$ for calibration spatial point $(\varnothing^t, \theta^t)$ $Cal_{sin}(\varnothing^t, \theta^t)$ = Pre−Calculated Sine Calibration Term $\left(\frac{A_n^t \sin(\varphi_n^t)}{\sqrt{\sum_{n=ant1}^{N} A_n^{t2}}}\right)$ for calibration spatial point $(\varnothing^t, \theta^t)$ and
   generate a direction finding result representing the direction of origin for the incoming signal.

2. The system of claim 1 wherein the instructions further include:
   calibrate the system relative to a reference antenna from the plurality of antennas in the array; and
   create and store a database of expected signal characteristics relative to the same reference antenna from the plurality of antennas in the array, prior to detecting the incoming signal.

3. The system of claim 2 wherein the calibration of the system, the creation and storage of the database of expected signal characteristics, and the detection of the incoming signal are performed relative to the same reference antenna from the plurality of antennas in the array.

4. The system of claim 1 wherein the instructions further include:
   communicate the direction finding results to one or both of the platform and an operator thereof.

5. The system of claim 1 wherein the POR-CIDF process is performed using cosine terms to calculate a correct bearing of the incoming signal.

6. The system of claim 1 wherein the R-CIDF process is performed using the real portion of a correlation coefficient to calculate a correct bearing of the incoming signal.

7. The system of claim 1 wherein the plurality of antennas in the at least one antenna array have matching antenna patterns and the data is analyzed using the POR-CIDF process.

8. The system of claim 1 wherein the plurality of antennas in the at least one antenna array have non-matching amplitude patterns and the data is analyzed using the R-CIDF process.

9. The system of claim 1 wherein the platform is one of an aircraft, a munition, a sea-based, a land-based vehicle, and a man-portable direction finding system.

* * * * *